United States Patent Office 3,241,640
Patented Mar. 22, 1966

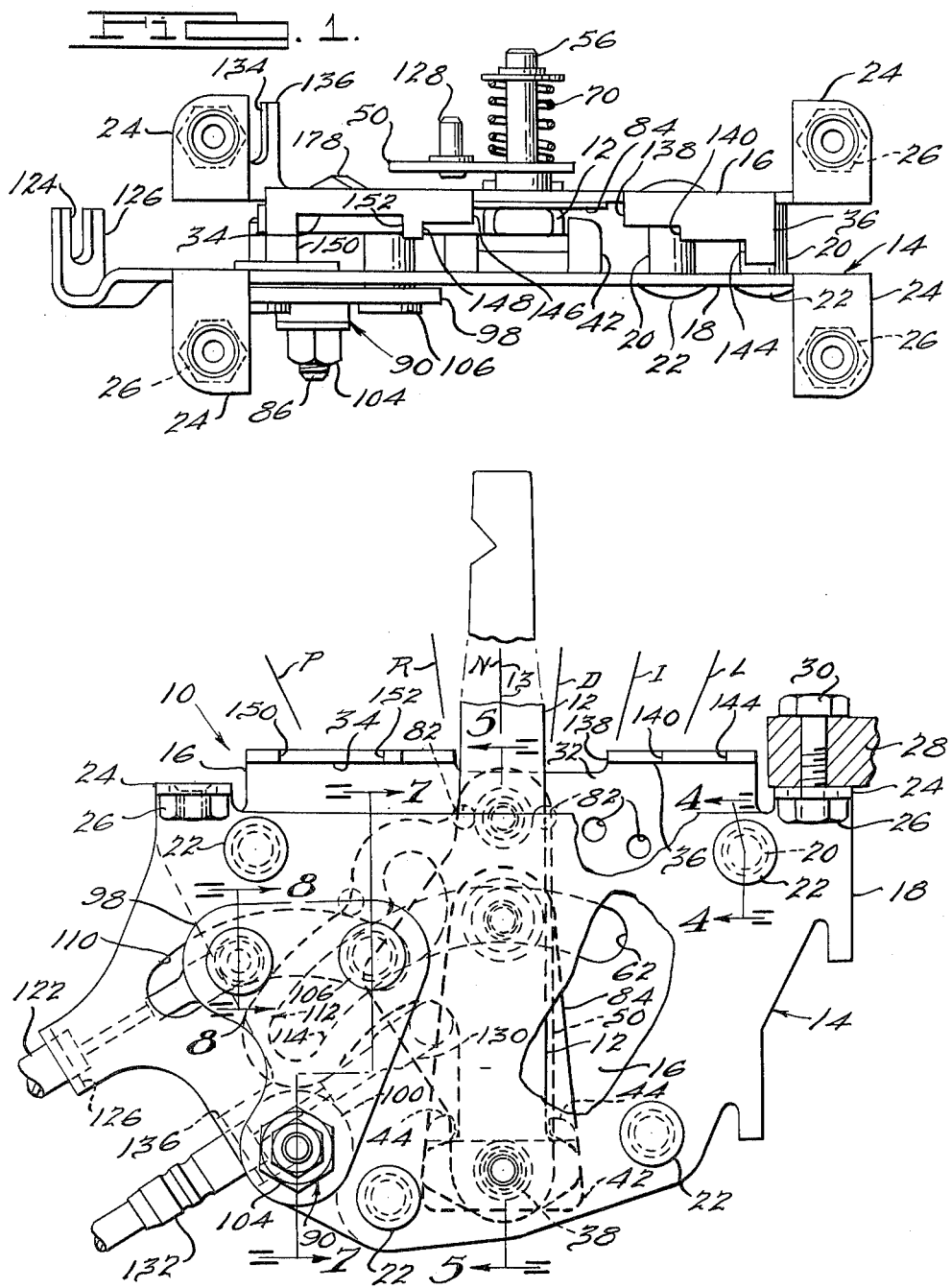

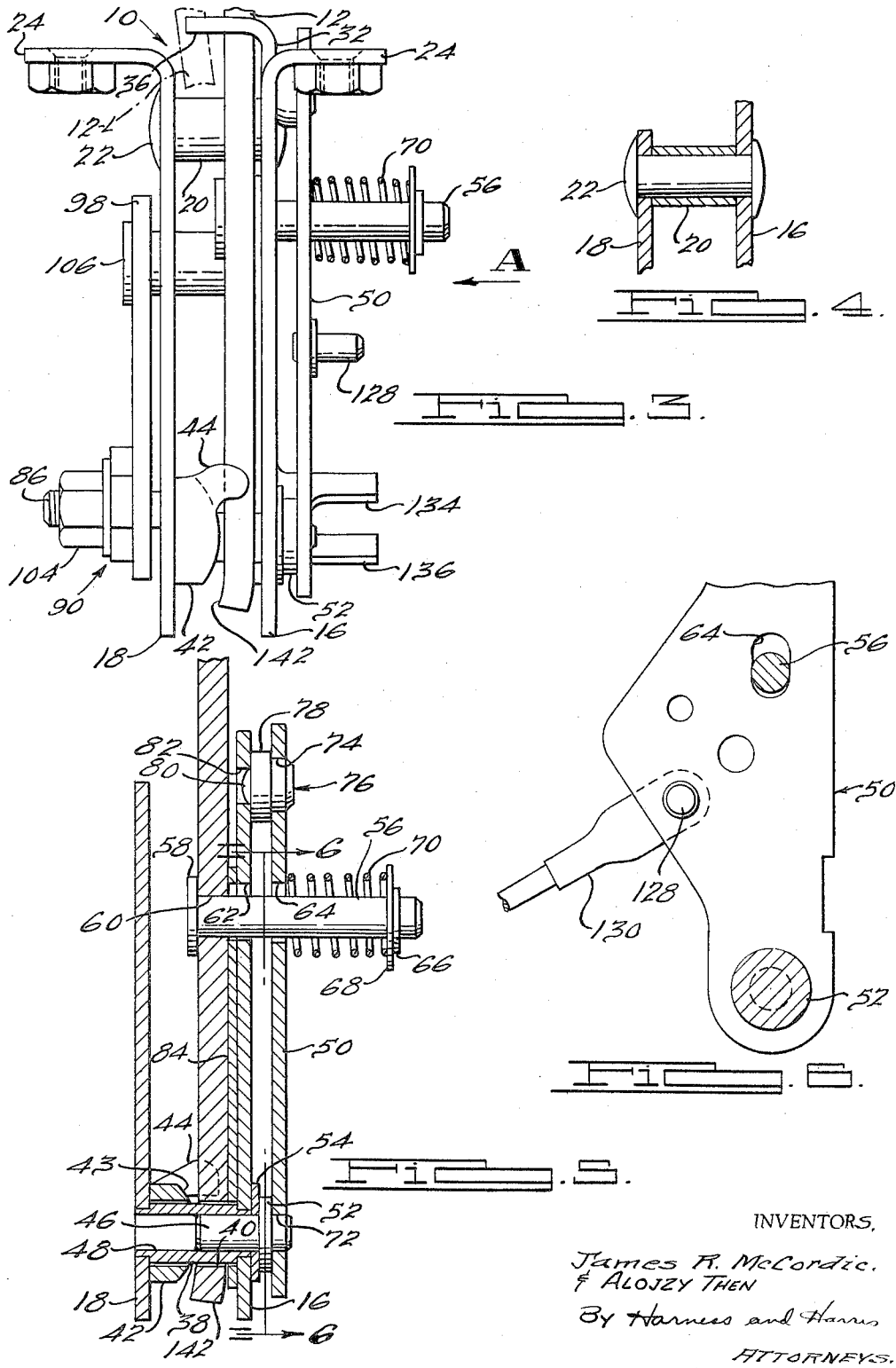

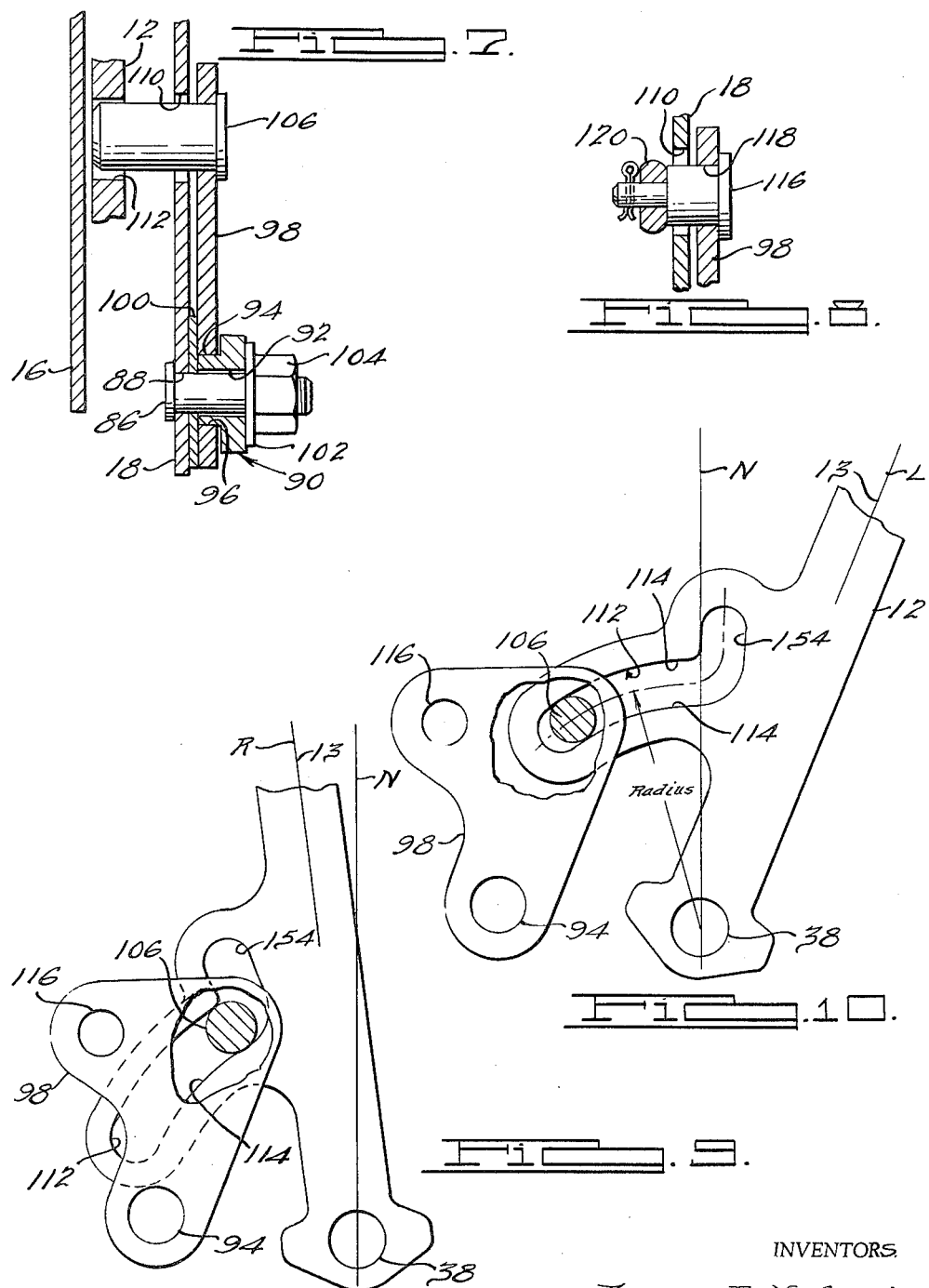

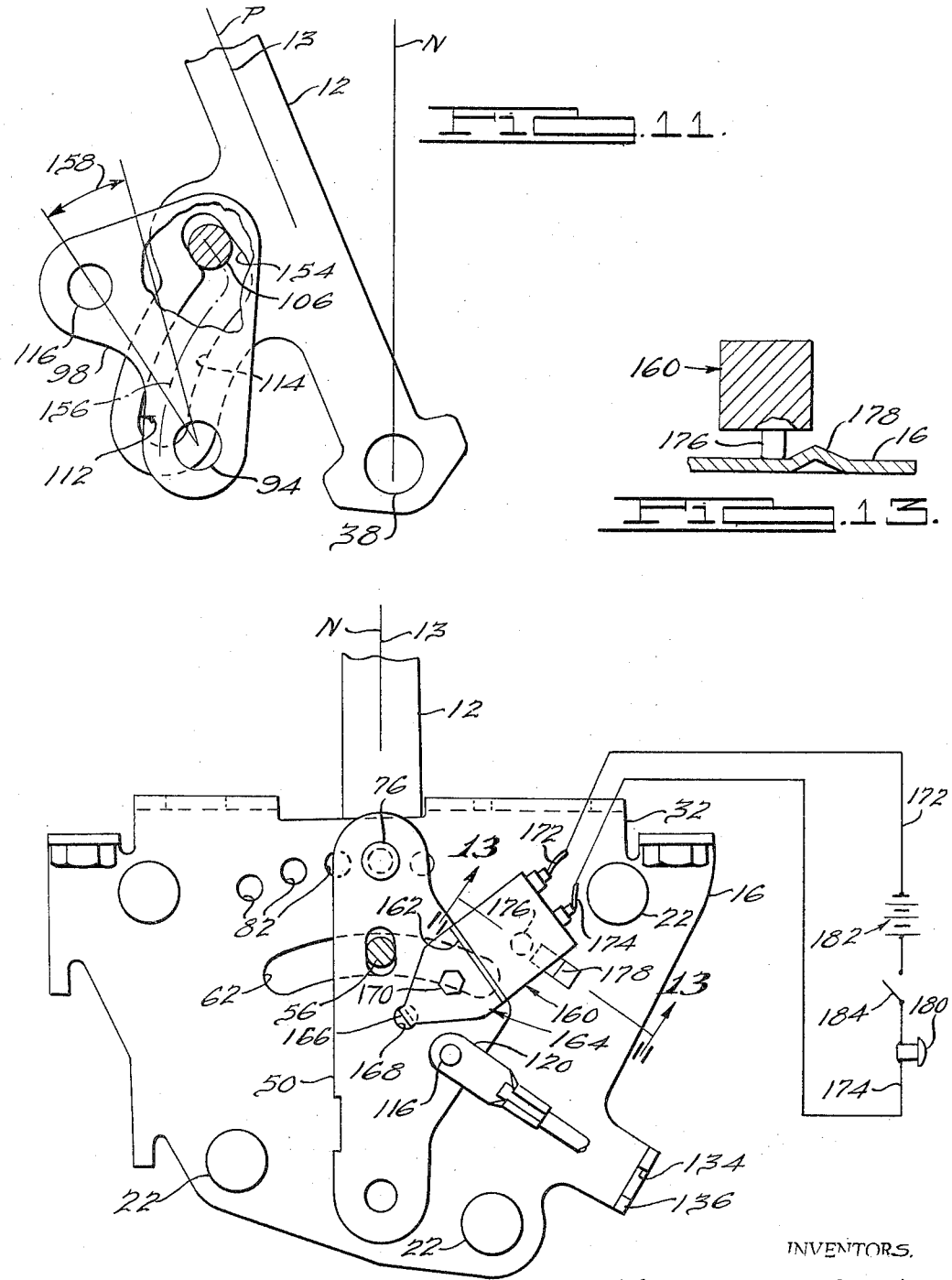

3,241,640
CONTROL LINKAGE ARRANGEMENT
James R. McCordic, Royal Oak, and Alojzy Then, Madison Heights, Mich., assignors to Chrysler Corporation, Highland Park, Mich., a corporation of Delaware
Filed July 3, 1963, Ser. No. 292,554
11 Claims. (Cl. 192—4)

This invention relates generally to transmissions and more particularly to means for actuating the gear shift control, as commonly associated with automatic transmissions, in order to select any one of a variety of transmission operating ranges or conditions.

In the recent past the automobile industry has experienced an increased demand for providing such gearshift control actuator assemblies in areas of the passenger compartment, other than the usual dashboard or steering column mounting locations, such as between separated seats provided for the vehicle operator and the other front-seat passenger.

In addition to actuating the gearshift control, such actuator assemblies are often required to perform other related functions, as for example, actuating a transmission parking sprag or other vehicle braking apparatus and completing electrical switching funcitons as for the vehicle back-up lights whenever the transmission is placed in reverse drive condition.

Accordingly a general object of this invention is to provide a novel and improved gear shift control actuating assembly which may be readily adapted for use within such areas of the automobile passenger compartment as between divided seats.

Another object of the invention is to provide a novel and improved gearshift control actuating assembly which is small enough to be readily contained within a relatively small space, and yet capable of performing additional functions ancillary to actuation of the gearshift control.

Other more specific objects and advantages of the invention will become apparent from the following description and accompanying drawings wherein:

FIGURE 1 is a top plan view of a gearshift control actuating assembly constructed in accordance with the teachings of this invention;

FIGURE 2 is a side elevational view of the actuating assembly illustrated in FIGURE 1;

FIGURE 3 is a right-hand end elevational view of the invention as illustrated in FIGURE 2;

FIGURE 4 is a fragmentary cross-secional view taken on the plane of line 4—4 of FIGURE 2 and looking in the direction of the arrows;

FIGURE 5 is a cross-sectional view taken substantially on the plane of line 5—5 of FIGURE 2;

FIGURE 6 is a partial cross-sectional view taken substantially on the plane of line 6—6 of FIGURE 5;

FIGURES 7 and 8 are fragmentary cross-sectional views taken substantially on the planes of line 7—7 and line 8—8, respectively, of FIGURE 2 and looking in the port structure 14 comprised of vertically extending side plates 16 and 18 which are secured to each other in spaced relationship by means of a plurality of tubular spacers 20 and cooperating rivets 22 (also see FIGURE 4).

Laterally extending tabs or ear portions 24 provided at the upper portion of side plates 16 and 18 are provided with internally threaded nuts 26, secured thereto as by welding, for rigidly mounting the support structure 14 to an appropriate portion 28 of the vehicle as by means of screws 30, one of which is shown.

An extension 32 at the upper end of side plate 16 is provided with laterally extending portions 34 and 36 which have, formed therein, several detents or abutments to be subsequently described.

Referring to FIGURES 2, 3 and 5, a generally cylindrical hub 38 having end portions of reduced diameter is retained within cooperating apertures formed in side plates 16 and 18. Hub 38, passing through aperture 40 formed in selector lever 12, provides a pivotal support for said selector lever. Additionally, an end thrust block 42, having a generally cylindrical-like surface 43 formed on one side thereof, is located about and supported by the hub 38. Spaced ear portions 44 formed at the respective ends of block 42 confine the selector lever 12 generally therebetween so that rotation of said lever 12 about hub 38 is accompanied by rotation of thrust block 42. A transmission cable lever pivot 46 received within a bore 48 formed in hub 38 provides a pivotal support for the transmission cable lever 50. A radially directed shoulder 52, formed on pivot 46 intermediate the ends thereof, and an annular spacer 54 cooperate in maintaining the pivotal end of lever 50 a prescribed distance away from side plate 16.

A selector lever guide pin 56, provided with a head portion 58 at one end thereof and closely received through an aperture 60 formed in selector lever 12, extends through an arcuate slot 62 in side plate 16 and through an elongated slot 64 in transmission cable lever 50. The projecting end of guide pin 56, provided with a suitable annular recess, carries a clip 66 which serves to restrain axial movement of an annular washer 68 which, in turn, confines a coiled compression spring 70 between itself and the outer-most surface of transmission cable lever 50.

Preferably in alignment with pivot aperture 72 and slot 64, and radially outwardly thereof, is an aperture 74 formed in cable lever 50 adapted to receive one end of a detent assembly 76. A radially directed shoulder 78 formed on the detent assembly 76 serves as a spacer which cooperates with spacer 54 and shoulder 52 in maintaining cable lever 50 a fixed distance away from side plate 16. A spherical detent member 80 contained generally within detent assembly 76 and resiliently urged axially outwardly thereof, is adapted to selectively engage one of a plurality of spaced receiving apertures 82 formed in side plate 16 and having their respective centers on an arc which is generally concentric with the axis of hub 38. A spacer 84 pivotally mounted about hub 38 and located between selector lever 12 and side plate 16 has an elon- A parking sprag lever guide pin 106, tightly received through an aperture 108 formed in sprag lever 98, extends inwardly thereof through a bean slot type of opening 110 formed in side plate 16 and into a cam slot 112 formed in selector lever 12. Opening 110 is formed generally arcuately about the axis of aperture 88 and pivot pin 86 while bean slot opening 62 and the major portion 114 of cam slot 112 are formed arcuately and substantially concentrically about the axis of hub 38. Accordingly, as seen from both FIGURES 2 and 7, guide pin 106 is continually confined to a position which is in the area generally defined by the intersection of arcuate opening 110 and cam slot 112.

As illustrated in cross-section in FIGURE 8, a parking sprag cable pin 116, tightly received through an aperture 118 formed in lever 98, extends inwardly through opening 110 of side plate 18 and has pivotally secured to the end thereof one end of a parking sprag actuating cable 120. A cable guide or shroud 122 is secured within an opening 124 formed in a supporting tab 126 provided by side plate 18 and bent inwardly thereof. Similarly, a pin 128, as shown in FIGURES 3 and 6, may be provided in and carried by transmission lever 50 so as to pivotally support one end of the transmission actuating cable 130. The cable shroud 132 is similarly supported within an opening 134 of a tab 136 provided by side plate 16, outwardly thereof.

Referring to FIGURE 2, the radiating lines identified as P, R, N, D, I and L indicate the position of center line 13 when the selector lever 12 is moved to transmission operating ranges or conditions of Park, Reverse, Neutral, Drive, Intermediate Forward and Low Forward, respectively. Transmission lever 50 being secured to selector lever 12 by guide pin 56 for rotation therewith about hub 38, of course correspondingly follows lever 12 to such positions to which lever 12 is moved. As selector lever 12 is moved from position L, through I, D and N, to position R detent member 80, carried by the transmission lever 50, successively engages the spaced detent apertures 82 corresponding to the particular selector lever position. Accordingly, if the selector lever 12 is allowed to remain in any of the positions from L to R, detent member 80 provides a restraining force for preventing the accidental displacement of lever 12 from its selected position.

In order to attain the various positions, selector lever 12 is not only rotated clockwise or counter-clockwise about the axis of hub 38 (as viewed in FIGURE 2) but is also at times cocked to the left from its neutral position (as viewed in FIGURE 3) in order to engage selected abutments formed on laterally projecting portions 34 and 36. For example, in order to achieve Drive position, lever 12 need only be rotated clockwise from the FIGURE 2 position until lever 12 strikes abutment surface 138 on portion 36. At this time centerline 13 will have assumed position D and detent member 80 will have engaged a cooperating detent aperture 82.

In order to place lever 12 in the Intermediate Forward position, selector lever 12 must first be cocked to the left (as viewed in FIGURES 3 and 5), about the generally cylindrical surface 43 of thrust block 42 and then rotated clockwise (as viewed in FIGURE 2) until lever 12 engages abutment surface 140. The bottom 142 of lever 12 is preferably bent slightly inwardly as shown in FIGURES 3 and 5 in order to avoid possible binding with either spacer 84 or side plate 16 during such periods as when lever 12 is in a cocked position. The most cocked position of lever 12, as illustrated fragmentarily in phantom lines in FIGURE 3 and identified as 12-L, is that assumed by the selector lever when it is moved against abutment surface 144 which is the Low Forward position. Similarly, abutments 146 and 148, respectively, determine the Neutral and Reverse positions while abutment surfaces 150 and 152 confine selector lever 12 in the Park position.

As selector lever 12 is moved to selected positions, the transmission lever 50, driven through pin 56, is similarly rotated about its concentric pivot 46 causing connecting pin 128 to correspondingly actuate the associated transmission control cable 130 (FIGURES 2, 3 and 6). Spring 70 not only provides a somewhat lost motion connection between lever 50 and selector lever 12, but also resiliently urges lever 12 to its vertical position of FIGURE 3. That is, because of spring 70, lever 12, lever 50 and detent assembly 76 are all urged toward a common member, which is, the side plate 16.

Cam slot 112, which in the preferred embodiment is formed integrally with lever 12, is rotated generally about hub 38 as selector lever 12 is moved to positions P through L. As was previously stated the major portion 114 of cam slot 112 is made substantially concentrically with the axis of hub 38. Accordingly, with reference to FIGURE 2 and as illustrated in FIGURES 9 and 10, wherein some of the elements are illustrated diagrammatically, it can be seen that, because of cam portion 114 being of a substantially constant radius about hub 38, movement of the selector lever 12 from the Reverse position to the Low position causes no movement of follower pin 106 which is secured within the sprag lever 98. Consequently, lever 98 is allowed to remain in the undisturbed condition illustrated by FIGURES 2, 9 and 10 as selector lever 12 is moved through the range of Reverse to Low positions.

However, as illustrated by FIGURE 11, movement of selector lever 12 to the Park position, in the extreme left, causes rotation of sprag lever 98 to rotate counter-clockwise about diameter 94 of cam member 90 from the FIGURE 9 to the FIGURE 11 position. This movement of lever 98 is achieved by means of cam portion 154, which is formed generally radially of the axis of hub 38 so as to be a continuation of cam portion 114.

That is, since the distance between the axes of diameter 94 and follower pin 106 is fixed at any one time, follower pin 106 must continually assume a position whereat the axis thereof passes through a point determined by the intersection of the centerline 156 of cam slot 112 and a circle having its center coincident with the axis of diameter 94 and its radius equal to the distance between the axes of diameter 94 and pin 106. The angular displacement indicated generally at 158 of FIGURE 11 represents the change in position of sprag cable actuating pin 116 from that of FIGURE 9 to that of FIGURE 11. Movement of lever 98 to the FIGURE 11 position actuates the transmission parking sprag cable 120, illustrated in FIGURES 2 and 8, thereby, as well known in the art, locking the transmission.

Cam member 90 is provided in order to provide means for adjusting the relationship between the several elements of the parking sprag lever assembly and the selector lever 12 in order to assure the actuation of lever 98 to occur at precisely the correct instant. That is, because of the dimensional tolerances usually incurred during manufacturing, the position of follower pin 106 within cam slot 112 may vary as between any two assemblies. In the embodiment disclosed, it is desired that movement of selector lever 12 from the Reverse position to the Park position is immediately accompanied by movement of sprag lever 98. In order to achieve this, it is of course necessary to have follower pin 106 to the extreme right position of cam portion 114 when selector lever 12 is in the Reverse position so that movement of lever 12 from that position to Park is immediately accompanied by the movement of follower pin 106 into radially extending cam portion 154.

For example, let it be assumed that a particular assembly does not have pin 106 properly positioned within cam portion 114, as described above, and that pin 106 is actually some slight but significant distance to the left of that position which it should assume when in Reverse position. In order to correct this condition it becomes, necessary to only loosen nut 104 (see FIGURES 2 and 7) and rotate cam member 90 about pin 86 until lever 98 is raised upwardly, by the eccentrically disposed diameter 94, a distance sufficient to move follower pin 106 upwardly and to the right within cam slot 112 until the proper relationship is attained between pin 106 and cam portion 114. Subsequently, nut 104 is again tightened causing the diameter 94 of cam member 90 to act as the pivotal support about which lever 98 rotates.

In addition to the above, means are provided in order to enable the structure disclosed to perform an additional function. For example, FIGURE 12, a view taken generally in the direction of arrow A of FIGURE 3, illustrates an electrical switch assembly 160 mounted on a transversely projecting arm portion 162 of a bracket 164. The other leg of the bracket is provided with an inwardly directed tang 166, received within an opening 168 formed in lever 50, and is secured to said lever as by means of a screw 170. Switch assembly 160, having suitable electrical conductors 172 and 174 extending therefrom, is provided with a movable switching member 176 projecting outwardly therefrom towards side plate 16. Bracket 164, and switch 160 are so positioned on lever 50 as to have member 176 in close proximity to a projecting cam portion 178 formed on side plate 16 whenever selector lever 12 is in the Neutral position. Whenever selector lever 12 is moved to the Reverse position, switch member 176 passes across and is actuated by cam portion 178 causing switch assembly to exhibit a control function as by closing an associated electrical circuit.

Such an electrical circuit may be one for the vehicle back-up lights as schematically illustrated in FIGURE 12 wherein a back-up lamp 180 is serially connected in a circuit comprised of conductors 172 and 174, a suitable source of electrical potential 182 and an ignition controlled switch 184. In considering FIGURES 2, 11, 12 and 13, collectively, it becomes apparent that as selector lever 12 is moved to the Park position, switch member 176 completely traverses cam portion 178 causing switch assembly 160 to open its associated circuit.

The invention, although primarily described with reference to an automatic transmission is obviously suitable for use on the conventional manual type of transmission. And, even though lever 98 has been referred to as a parking sprag actuating lever, it should be apparent that the output movement of lever 98 could be employed for actuation of any suitable braking device. Further, although only a preferred embodiment of the invention has been disclosed and described, it is apparent that various modifications of the invention are possible within the scope of the appended claims.

We claim:

1. A gear shift mechanism for a multiple speed power transmission comprising a support member, a pivot member connected to said support member, a selector lever journalled near its one end on said pivot member and having its other end extending beyond said support member, means effective to maintain said selector lever in any one of a plurality of positions, first lever means pivotally supported on said support member continually moved by said selector lever to positions corresponding to the position assumed by said selector lever, actuating means controlled by said first lever means for shifting said multiple speed power transmission in accordance with the position of said selector lever and said first lever means, second lever means pivotally supported on said support member, said second lever means being adapted for connection to second actuating means for at times actuating an associated braking mechanism, and cam means actuated and positioned by said selector lever for at times moving said second lever means in order to actuate said braking mechanism, said cam means comprising an elongated cam slot formed in a portion of said selector lever, said cam slot being further characterized by a first slot portion having a curvature which is substantially concentric with the center of rotation of said journalled selector lever and a second slot portion joining said first slot portion and being directed generally radially of said center of rotation of said selector lever, and a cam slot follower received within said cam slot and secured to said second lever means for transmitting motion therebetween.

2. A gear shift mechanism for a multiple speed power transmission comprising a support assembly having spaced walls, a selector trunnion positioned generally between and transversely of said walls so as to be retained thereby, a selector lever, an aperture formed through said selector lever near one end thereof so as to journal said selector lever on said trunnion, the other end of said selector lever extending beyond said spaced walls, means positioned by said selector lever effective to maintain said selector lever in any one of a plurality of positions, first lever means pivotally supported on said support assembly continually moved by said selector lever to positions corresponding to the position assumed by said selector lever, actuating means operatively connected to said first lever means for shifting said multiple speed power transmission in accordance with the position of said selector lever and said first lever means, second lever means pivotally supported on said support assembly, said second lever means being adapted for connection to second actuating means for at times actuating an associated braking mechanism, cam means carried by and positioned by said selector lever for at times engaging and moving said second lever means in order to actuate said braking mechanism, and a plurality of spaced abutments carried by said support assembly and extending generally into the path of travel of said selector lever as it is rotated about said trunnion, said aperture formed through said selector lever being of such a size relative to said trunnion as to normally simultaneously permit two degrees of motion between said selector lever and said trunnion, said two degrees of motion consisting of relative rotative motion between said selector lever and said trunnion and relative angular motion of said selector lever with respect to the axis of said trunnion in order to enable the rotation of said selector lever beyond respective ones of said spaced abutments.

3. A gear shift mechanism for a multiple speed power transmission comprising a support assembly having spaced walls, a selector trunnion positioned generally between and transversely of said walls so as to be retained thereby, a variably positioned selector lever journalled near one end thereof on said trunnion and between said spaced walls, said selector lever having its other end extending beyond said spaced walls, detent means operatively connected to and positioned by said selector lever effective to maintain said selector lever in any one of a plurality of selected positions, first lever means pivotally supported on said support assembly without said spaced walls, motion transmitting means secured to said selector lever and extending through one of said spaced walls for operatively connecting and continually moving said first lever means to positions corresponding to the position assumed by said selector lever, said first lever means being adapted for connection to actuating means for shifting said multiple speed power transmission in accordance with the position of said selector lever and said first lever means, a cam carried by said selector lever so as to be positioned in accordance with the position assumed by said variably positioned selector lever, second lever means pivotally supported on said support assembly without said spaced walls, and second motion transmitting means secured to said second lever means and extending through one of said spaced walls in order to operatively engage said cam, said second lever means being adapted for connection to second actuating means for at times actuating an associated braking mechanism, said cam being effective only upon attainment of a predetermined position by said selector lever to move said second motion transmitting means and said second lever means in order to actuate said braking mechanism.

4. A gear shift mechanism for a multiple speed power transmission comprising a support assembly having spaced walls, a selector trunnion positioned generally between and transversely of said walls so as to be retained thereby, a variably positioned selector lever journalled near its one end on said trunnion and having its other end extending beyond said spaced walls, first lever means pivotally supported on said support assembly without said spaced walls, connecting means secured to said selector lever and extending through one of said spaced walls for continually moving said first lever means to positions corresponding to the position assumed by said selector lever, detent means carried by said first lever means effective to maintain said first lever means and said selector lever in any one of a plurality of positions, resilient means carried by said connecting means urging said selector lever and first lever means toward each other and urging said detent means against said one of said spaced walls, actuating means connected to said first lever means for shifting said multiple speed power transmission in accordance with the position of said selector lever and said first lever means, second lever means pivotally supported on said support assembly, second actuating means connected to said second lever means for at times actuating a braking mechanism, motion transmitting means secured to said second lever means, and pivotally supported cam means operatively engaging said motion transmitting means, said cam means being continuously positioned by said selector lever for only at times moving said second lever means through said motion transmitting means in order to actuate said braking mechanism.

5. A gear shift mechanism for a multiple speed power transmission, comprising a support assembly having a pair of spaced walls, a tubular bearing member retained at its opposite ends in axially aligned first and second apertures formed in the respective walls, a manually positionable selector lever loosely journalled near its lower end about said tubular bearing member between inner sides of said spaced walls and having its other end directed generally upwardly and extending beyond said spaced walls, a first pivot member partly received within said tubular bearing member and having one end projecting a substantial distance beyond the outer side of one of said walls, a generally vertically extending transmission actuating lever having a first bearing aperture formed therein near the lower-most end thereof for the pivotal reception of said projecting end of said first pivot member, first annular spacer means provided about said projecting end between said outer side of said one of said walls and said transmission actuating lever for maintaining said lower-most end of said transmission actuating lever a minimum distance away from said outer surface of said one of said walls, a plurality of arcuately spaced apertures formed in said one of said walls, a detent assembly carried by said transmission actuating lever near the upper-most end thereof for successively engaging said arcuately spaced apertures as said transmission lever is pivoted about the axis of said first pivot member, said detent assembly comprising a body portion containing a ball member resiliently urged outwardly therefrom towards said one of said walls, said body portion also being provided with an annular shoulder portion located generally between said transmission actuating lever and said outer surface of said one of said walls for maintaining said upper-most end of said transmission actuating lever a minimum distance away from said outer surface of said one of said walls, a generally vertically directed elongated slot formed in said transmission lever intermediate of said bearing aperture and said detent assembly, a first arcuate slot formed in said one of said walls generally between the axis of said tubular bearing and said arcuately spaced apertures, an elongated motion transmitting pin having one end secured in said selector lever and having its other end projecting laterally therefrom and through said arcuate slot and said elongated slot so as to extend a substantial distance beyond said transmission actuating lever, an annular abutment member received about the projecting end of said motion transmitting pin, a coiled compression spring received about said projecting end of said motion transmitting pin between said abutment member and said transmission actuating lever so as to continually resiliently urge said transmission actuating lever and said selector lever towards each other, first means for operatively connecting said transmission actuating lever to a gear shift control of said transmission, a second pivot assembly partly received within a third aperture formed in the other of said spaced walls and extending laterally outwardly therefrom, a generally vertically extending transmission parking sprag actuating lever having a second bearing aperture formed therein near the lower-most end thereof for operatively engaging said pivot assembly, a second arcuate slot formed in said other wall generally arcuately about the axis of said third aperture, said pivot assembly comprising a tubular bushing having an outer diameter received within said second bearing aperture, an inner diameter formed in said bushing having its axis eccentrically disposed to the axis of said outer diameter, a cylindrical support pin retained within said third aperture extending through said inner diameter and beyond an annular flange formed on said bushing, an internally threaded nut member adapted to cooperate with an externally threaded portion of said support pin for axially urging said bushing into locked position generally against said other wall, a cam slot formed in said selector lever, said cam slot being formed as to have first and second cam portions, said first cam portion being formed so as to be disposed generally arcuately about the axis of said tubular bearing member, said second cam portion being formed so as to be a continuation of said first cam portion but extending generally radially outwardly therefrom with respect to the axis of said tubular bearing member, a sprag lever actuating pin having one end retained by said sprag actuating lever and having its other end extending through said arcuate slot and into said cam slot so as to be confined thereby, second means for operatively connecting said transmission parking sprag lever to the transmission parking sprag, a plurality of laterally extending abutment members spaced on opposite sides of said selector lever when said selector lever is in a substantially vertical position for positively limiting the degree to which said selector lever can be pivoted about said tubular bearing in planes generally transverse to said tubular bearing, a thrust member received about said tubular bearing between the inner surface of said other wall and said selector lever, said compression spring being effective to allow said selector lever to be pivoted angularly about said tubular bearing in planes passing generally through and containing the axis of said tubular member so as to permit said selector lever to be pivoted in planes generally transverse to said tubular member and against any selected one of said plurality of laterally extending abutment members, an electrical circuit including a lamp, and switching means carried by said transmission actuating lever for completing said electrical circuit and energizing said lamp when said selector lever is rotated to a predetermined one of said plurality of laterally extending abutment members, said second cam portion being effective upon said selector lever moving from said predetermined one of said plurality of laterally extending abutment members to the next most remotely disposed abutment member wherein said selector lever is more nearly approaching the horizontal to move said sprag lever actuating pin and sprag actuating lever so as to actuate said transmission parking sprag.

6. A gear shift mechanism for a multiple speed power transmission, comprising a support assembly having a pair of spaced walls, a bearing member retained at its opposite ends by the respective walls, a manually positionable selector lever loosely journalled near its lower end about said bearing member and having its other end directed generally upwardly and extending beyond said spaced walls, a first pivot member secured to one of said walls, a generally vertically extending transmission actuating lever having a first bearing aperture formed therein intermediate the ends thereof for the pivotal reception therein of said first pivot member, a plurality of arcuately spaced apertures formed in said one of said walls, a detent assembly carried by said transmission actuating lever for successively engaging said arcuately spaced apertures as said transmission lever is pivoted about the axis of said first pivot member, an elongated slot formed in said transmission lever, a first arcuate slot formed in said one of said walls generally between the axis of said bearing and said arcuately spaced apertures, a motion transmitting pin having one end secured in said selector lever and having its other end projecting laterally therefrom and through said arcuate slot and said elongated slot so as to operatively connect said selector lever to said transmission actuating lever, first means for operatively connecting said transmission actuating lever to a gear shift control of said transmission, a second pivot secured to the other of said spaced walls, a generally vertically extending transmission parking sprag actuating lever having a second bearing aperture formed therein for operatively engaging said second pivot, a second arcuate slot formed in said other wall generally arcuately about the axis of said third aperture, a cam member positioned by said selector lever, said cam member being formed as to have first and second cam portions, said first cam portion being formed so as to be disposed generally arcuately about the axis of said bearing member, said second cam portion being formed so as to be a continuation of said first cam portion but extending generally radially outwardly therefrom with respect to the axis of said bearing member, a sprag lever actuating pin having one end retained by said sprag actuating lever and having its other end extending through said second arcuate slot so as to operatively engage said cam member, second means for operatively connecting said transmission parking sprag lever to the transmission parking sprag, and a plurality of laterally extending abutment members spaced on opposite sides of said selector lever when said selector lever is in a substantially vertical position for positively limiting the degree to which said lever can be pivoted about said bearing in planes generally transverse to said tubular bearing, said second cam portion being effective upon said selector lever moving to a predetermined one of said plurality of laterally extending abutment members to move said sprag lever actuating pin and sprag actuating lever so as to actuate said transmission parking sprag.

7. A gear shift mechanism for a multiple speed power transmission, comprising a support assembly, a bearing member retained by said support assembly, a manually positionable selector lever journalled about said bearing member, a first pivot member secured to said support assembly, a transmission actuating lever having a first bearing aperture formed therein intermediate the ends thereof for the pivotal reception therein of said first pivot member, a plurality of arcuately spaced apertures formed in said support assembly, a detent assembly carried by said transmission actuating lever for successively engaging said arcuately spaced apertures as said transmission lever is pivoted about the axis of said first pivot member, a motion transmitting member operatively connecting said selector lever to said transmission actuating lever, first means for operatively connecting said transmission actuating lever to a gear shift control of said transmission, a second pivot secured to said support assembly, a transmission parking sprag actuating lever having a second bearing aperture formed therein for operatively engaging said second pivot, a cam member positioned by said selector lever, said cam member being formed as to have first and second cam portions, said first cam portion being formed so as to be disposed generally arcuately about the axis of said bearing member, said second cam portion being formed so as to be a continuation of said first cam portion but extending generally radially outwardly therefrom with respect to the axis of said bearing member, a sprag lever actuating pin having one end retained by said sprag actuating lever and having its other end in operative engagement with said cam member, second means for operatively connecting said transmission parking sprag lever to the transmission parking sprag, and a plurality of laterally extending abutment members spaced on opposite sides of said selector lever when said selector lever is in a substantially vertical position for positively limiting the degree to which said selector lever can be pivoted about said bearing in planes generally transverse to said bearing, said second cam portion being effective upon said selector lever moving to a predetermined one of said plurality of laterally extending abutment members to move said sprag lever actuating pin and sprag actuating lever so as to actuate said transmission parking sprag.

8. A gear shift mechanism for a multiple speed power transmission, comprising a support assembly, a bearing member retained by said support assembly, a manually positionable selector lever journalled about said bearing member, a first pivot member secured to said support assembly, a transmission actuating lever having a first bearing aperture formed therein intermediate the ends thereof for the pivotal reception therein of said first pivot member, a plurality of arcuately spaced apertures formed in said support assembly, a detent assembly carried by said transmission actuating lever for successively engaging arcuately spaced apertures as said transmission lever is pivoted about the axis of said first pivot member, a motion transmitting member operatively connecting said selector lever to said transmission actuating lever, first means for operatively connecting said transmission actuating lever to a gear shift control of said transmission, a second pivot secured to said support assembly, a transmission parking sprag actuating lever having a second bearing aperture formed therein for operatively engaging said second pivot, a cam member positioned by said selector lever, said cam member being formed as to have first and second cam portions, said first cam portion being formed so as to be disposed generally arcuately about the axis of said bearing member, said second cam portion being formed so as to be a continuation of said first cam portion but extending generally radially outwardly therefrom with respect to the axis of said bearing member, a sprag lever actuating pin having one end retained by said sprag actuating lever and having its other end in operative engagement with said cam member, a second means for operatively connecting said transmission parking sprag lever to the transmission parking sprag, a plurality of laterally extending abutment members spaced on opposite sides of said selector lever when said selector lever is in a substantially vertical position for positively limiting the degree to which said selector lever can be pivoted about said bearing in planes generally transverse to said tubular bearing, an electrical circuit including a lamp, and switching means carried by said transmission actuating lever for completing said electrical circuit and energizing said lamp when said selector lever is rotated to a predetermined one of said plurality of laterally extending abutment members, said second cam portion being effective upon said selector lever moving to another predetermined one of said plurality of laterally extending abutment members to move said sprag lever actuating pin and sprag actuating lever so as to actuate said transmission parking sprag.

9. A gear shift mechanism for a multiple speed power transmission, comprising a support assembly having a pair of spaced walls, a tubular bearing member retained at its opposite ends in axially aligned first and second apertures formed in the respective walls, a manually positionable selector lever loosely journalled near its lower end about said tubular bearing member between inner sides of said spaced walls and having its other end directed generally upwardly and extending beyond said spaced walls, a first pivot member partly received within said tubular bearing member and having one end projecting a substantial distance beyond the outer side of one of said walls, a generally vertically extending transmission actuating lever having a first bearing aperture formed therein near the lower-most end thereof for the pivotal reception of said projecting end of said first pivot member, a plurality of arcuately spaced apertures formed in said one of said walls, a detent assembly carried by said transmission actuating lever near the uppermost end thereof for successively engaging said arcuately spaced apertures as said transmission lever is pivoted about the axis of said first pivot member, a generally vertically directed elongated slot formed in said transmission lever intermediate of said bearing aperture and said detent assembly, a first arcuate slot formed in said one of said walls generally between the axis of said tubular bearing and said arcuately spaced apertures, an elongated motion transmitting pin having one end secured in said selector lever and having its other end projecting laterally therefrom and through said arcuate slot and said elongated slot so as to extend a substantial distance beyond said transmission actuating lever, an annular abutment member received about the projecting end of said motion transmitting pin, a coiled compression spring received about said projecting end of said motion transmitting pin between said abutment member and said transmission actuating lever urging so as to continually resiliently urge said transmission actuating lever and said selector lever towards each other, first means for operatively connecting said transmission actuating lever to the transmission gear shift control, a second pivot assembly partly received within a third aperture formed in the other of said spaced walls and extending laterally outwardly therefrom, a generally vertically extending transmission parking sprag actuating lever having a second bearing aperture formed therein near the lower-most end thereof for operatively engaging said pivot assembly, a second arcuate slot formed in said other wall generally arcuately about the axis of said third aperture, said pivot assembly comprising a tubular bushing having an outer diameter received within said second bearing aperture, an inner diameter formed in said bushing having its axis eccentrically disposed to the axis of said outer diameter, a cylindrical support pin retained within said third aperture extending into said inner diameter, a cam slot formed in said selector lever, said cam slot being formed as to have first and second cam portions, said first cam portion being formed so as to be disposed generally arcuately about the axis of said tubular bearing member, said second cam portion being formed so as to be a continuation of said first cam potrion but extending generally radially outwardly therefrom with respect to the axis of said tubular bearing member, a sprag lever actuating pin having one end retained by said sprag actuating lever and having its other end extending through said second arcuate slot and into said cam slot so as to be confined thereby, second means for operatively connecting said transmission parking sprag lever to the transmission parking sprag, a plurality of laterally extending abutment members spaced on opposite sides of said selector lever when said selector lever is in a substantially vertical position for positively limiting the degree to which said selector lever can be pivoted about said tubular bearing in planes generally transverse to said tubular bearing, said compression spring being effective to allow said selector lever to be pivoted angularly about said tubular bearing in planes passing generally through and containing the axis of said tubular member so as to permit said selector lever to be pivoted in planes generally transverse to said tubular member and against any selected one of said plurality of laterally extending abutment members, an electrical circuit including a lamp, and switching means carried by transmission actuating lever for completing said electrical circuit and energizing said lamp when said selector lever is rotated to a predetermined one of said plurality of laterally extending abutment members, said second cam portion being effective upon said selector lever moving from said predetermined one of said plurality of laterally extending abutment members to the next most remotely disposed abutment member wherein said selector lever is more nearly approaching the horizontal to move said sprag lever actuating pin and sprag actuating lever so as to actuate said transmission parking sprag.

10. A gear shift mechanism for a multiple speed power transmission comprising a support assembly having spaced walls, a selector trunnion positioned generally between and transversely of said walls so as to be retained thereby, a variably positioned selector lever, an aperture formed through said selector lever near one end thereof so as to journal said selector lever on said trunnion, the other end of said selector lever extending beyond said spaced walls, first lever means pivotally supported on said support assembly without said spaced walls, connecting means secured to said selector lever and extending through one of said spaced walls for continually moving said first lever means to positions corresponding to the position assumed by said selector lever, detent means carried by said first lever means effective to maintain said first lever means and said selector lever in any one of a plurality of positions, resilient means carried by said connecting means urging said selector lever and first lever means toward each other and urging said detent means against said one of said spaced walls, actuating means connected to said first lever means for shifting said multiple speed power transmission in accordance with the position of said selector lever and said first lever means, second lever means pivotally supported on said support assembly, second actuating means connected to said second lever means for at times actuating a braking mechanism, motion transmitting means secured to said second lever means, pivotally supported cam means operatively engaging said motion transmitting means, said cam means being continuously positioned by said selector lever for only at times moving said second lever means through said motion transmitting means in order to actuate said braking mechanism, and a plurality of spaced abutments carried by said support assembly and extending generally into the path of travel of said selector lever as it is rotated about said trunnion, said aperture formed through said selector lever being of such a size relative to said trunnion as to normally permit simultaneously two degrees of motion between said selector lever and said trunnion, said two degrees of motion consisting of relative rotative motion between said selector lever and said trunnion and relative angular motion of said selector lever with respect to the axis of said trunnion in order to enable the rotation of said selector lever beyond respective ones of said spaced abutments.

11. A gear shift mechanism for a multiple speed power transmission comprising a support assembly having spaced walls, a selector trunnion positioned generally between and transversely of said walls so as to be retained thereby, a variably positioned selector lever journalled near its one end on said trunnion and having its other end extending beyond said spaced walls, first lever means pivotally supported on said support assembly without said spaced walls, connecting means secured to said selector lever and extending through one of said spaced walls for continually moving said first lever means to positions corresponding to the position assumed by said selector lever, detent means carried by said first lever means effective to maintain said first lever means and said selector lever in any one of a plurality of positions, resilient means carried by said connecting means urging said selector lever and first lever means toward each other and urging said detent means against said one of said spaced walls, actuating means connected to said first lever means for shifting said multiple speed power transmission in accordance with the position of said selector lever and said first lever means, second lever means pivotally supported on said support assembly, second actuating means connected to said second lever means for at times actuating a braking mechanism, motion transmitting means secured to said second lever means, pivotally supported cam means operatively engaging said motion transmitting means, said cam means being continuously positioned by said selector lever for only at times moving said second lever means through said motion transmitting means in order to actuate said braking mechanism, and additional adjustment means for adjusting said second lever means with respect to said cam means in order to enable said second lever means to start its movement at a precise position of said selector lever means, said adjusting means comprising an eccentric bearing member on which said second lever means is pivotally supported, said eccentric bearing member being adjustably positioned so as to vary the pivot axis of said second lever means in accordance with the eccentricity of said bearing member.

References Cited by the Examiner

UNITED STATES PATENTS

| | | | |
|---|---|---|---|
| Re. 23,719 | 10/1953 | Coombs. | |
| 2,430,118 | 11/1947 | Forssell. | |
| 2,584,055 | 1/1952 | Smith | 74—471 |
| 2,770,326 | 11/1956 | Wayman | 192—4 X |
| 2,907,421 | 10/1959 | Morse et al. | 192—.096 |
| 2,947,191 | 8/1960 | Waner | 192—.096 |
| 2,949,988 | 8/1960 | Morse | 192—.096 |

DON A. WAITE, *Primary Examiner.*

DAVID J. WILLIAMOWSKY, *Examiner.*